United States Patent Office 2,923,727
Patented Feb. 2, 1960

2,923,727

O-ALKYL-S-PENTACHLOROPHENYL THIOLCARBONATE

Clifton R. Neumoyer, Elkton, Md., assignor to Pennsalt Chemical Corporation, a corporation of Pennsylvania No Drawing. Application December 29, 1955
Serial No. 556,066

2 Claims. (Cl. 260—455)

This invention relates to novel derivatives of pentachlorothiophenol which have been found to possess useful biocidal properties.

The novel compounds of the invention have the formula

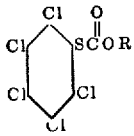

in which R may be alkyl and contain not in excess of about 4 carbon atoms. More specifically, R may be methyl, ethyl, propyl, isopropyl, n-butyl and isobutyl.

Generally, in the preparation of the novel compounds of the invention a quantity of pentachlorobenzenethiol and an approximately equivalent quantity of a halide, preferably the chloride, of an alkyl haloformate are reacted for about 0.1 to 10 hours in accordance with the reaction:

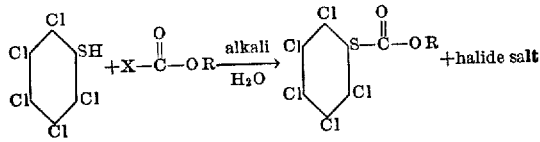

where X is halogen and R is alkyl. Sufficient aqueous alkali, such as sodium hydroxide, is added initially or added from time to time to maintain the reaction alkaline. At the end of the reaction period, the reaction mixture is cooled, and the crude insoluble product is filtered off, washed and dried. The crude product is then recrystallized from a solvent to produce a high yield of the purified compound. In some cases, it is desirable to elevate the reaction temperature which may be done by any conventional method.

In the use of the novel compounds of the invention as fungicides, it is advantageous to admix the active fungicidal ingredient with other materials, which will be referred to herein as fugicidal adjuvants. Such adjuvants in dust formulations may include a dust carrier, such as finely divided diatomaceous earth, talc, gypsum, fuller's earth, pyrophyllite, kaolin or bentonite.

In the case of liquid fungicidal compositions, water emulsions may be prepared and the adjuvant in this case may include organic solvents for the active ingredient, such as xylene, cyclohexanone, mesityl oxide, the cellosolves and carbitols, amines, acetone, benzene, butyl acetate, and the like. In the case of both dust and emulsions, surfactants effective to make the finely divided dust formulation water-wettable, or effective to make the organic solvent solution of the active material water-emulsifiable, are important adjuvants. For a listing of suitable surfactants, see McCutcheon, J. W., Soap and Sanitary Chemicals, August, September and October 1949.

The term "adjuvant" as used herein included finely divided solid materials, solvents, dispersing agents and emulsifying agents in emulsion formulations and surfactants for the active compound. The solvents should be non-phytotoxic when the formulation is to be used on growing plants.

The active compounds of the invention may be applied to plants at rates ranging from about 1 pound to 5 pounds or more of active ingredient per acre, depending upon the plant upon which it is used. The reference in the claims to the rate of application being a stated number of pounds per acre is intended to define also the rate when only one or a few plants are treated, as in nursery work, the rate per plant being capable of calculation from the acre rate by assuming a normal spacing of such plants in an acre of planting.

The invention will be further illustrated by reference to the following specific examples.

EXAMPLE 1

*Preparation of O-ethyl-S-pentachlorophenyl thiolcarbonate*

A 2-liter, three necked flask was fitted with a thermometer well, stirrer and dropping funnel. A water bath enclosed the lower one-half of the flask to provide heat or cooling. 20.5 grams (0.5 mole) of sodium hydroxide (97.4% NaOH) was dissolved in 1200 cc. of water, placed in the 2-liter flask and cooled to 15° C. 141.2 grams (0.5 mole) of pentachlorobenzenethiol was added with stirring until it completely dissolved in the sodium hydroxide solution. 59.7 grams (0.55 mole) of ethyl chloroformate was added to the solution at a temperature of 17°, while stirring, over a 45 minute period during which time a white precipitate formed. After all the chloroformate was added, stirring was continued for an additional one hour while the temperature was maintained between 15 and 20° C. The reaction mixture was filtered on paper in a Buchner funnel and washed several times with cold water. The product was placed on paper and allowed to air dry for several days. After drying the product weighed 184 grams (quantitative yield) and had a melting point of 88 to 103° C.

The crude product was recrystallized from hot methyl alcohol to yield 107 grams of O-ethyl-S-pentachlorophenyl thiolcarbonate having a melting point of 85 to 88° C. Chlorine and sulfur determinations of the recrystallized product were as follows:

|  | Found | Theory |
|---|---|---|
| Chlorine (percent) | 49.7 | 50.00 |
| Sulfur (percent) | 9.19 | 9.02 |

Using the same procedure as described above, methyl-pentachlorophenyl thiolcarbonate, propyl - pentachlorophenyl thiolcarbonate, isopropylpentachlorophenyl thiolcarbonate and n-butyl pentachlorothiophenyl thiolcarbonate and isobutyl pentachlorophenyl thiolcarbonate can be prepared by reacting pentachlorobenzenethiol with methylchloroformate, propylchloroformate, isopropylchloroformate, n-butylchloroformate and isobutylchloroformate respectively; or by reacting pentachlorobenzenethiol with the respective bromo formates instead of the chloro formates mentioned above.

EXAMPLE 2

A fungicidal test which is commonly employed to determine the activity of fungicides is the control of snapdragon rust, *Puccimia antirhinum*. The method, which has been described by McCallen, S. E. A., Evaluating Fungicides by Means of Greenhouse Snapdragon Rust, Contrib. Boyce Thompson Institute, 13(8): 367–84 (1944), involved the application of a 0.2% aqueous solution of O-ethyl-S-pentachlorophenyl thiolcarbonate to the foliage of snapdragon plants. Afterwards, a suspension of rust spores in water was atomized onto the foliage and maintained at 100% relative humidity for 24 hours. After 7 days, a count of the number of rust pustules per leaf was made and the control was compared with that of a standard fungicide in the same test. Effective control of snapdragon rust, that is 90% of the standard was obtained, the standard being ferric dimethyldithiocarbamate at the same concentration.

EXAMPLE 3

Another fungicidal test which is commonly employed to determine the activity of fungicides is the control of powdery mildew, *Erysiphe polygoni*, on the primary leaves of common bean plants. A water solution or dispersion of O-ethyl-S-pentachlorophenyl thiolcarbonate was sprayed, at a concentration of 0.2% by weight, onto fully expanded primary leaves of bean plants which were kept on a greenhouse bench until natural infection developed from a culture of infected plants kept in the same area. After a sufficient amount of mildew was developed on the check plants, a period requiring about two to three weeks, the number of spots on the primary leaves of the treated plants were counted and compared. The O-ethyl-S-pentachlorophenyl thiolcarbonate exhibited control of bean powdery mildew at the concentration tested (0.2%).

EXAMPLE 4

A liquid concentrate of the active ingredient which can be readily emulsified in water and sprayed on plants and trees is prepared by dissolving the fungicidal material in a suitable solvent and adding an emulsifying agent. An example of such a preparation is as follows; the figures are percent by weight.

| | Percent |
|---|---|
| O-ethyl-S-pentachlorophenyl thiolcarbonate | 25 |
| Xylene | 67.5 |
| Surfactant (ethylene oxide ether of alkylphenol (Nonic 300)) | 7.5 |

EXAMPLE 5

A suitable water-insoluble powder which will disperse in water can readily be made by the addition of a suitable diluent such as attaclay or talc with a dispersing agent such as Marasperse N (lignin-sulfonate salts) and a surface-active agent of an anionic or non-ionic type such as Igepon AP extra concentration or Kreelon. Such a formulation is prepared as follows:

| | Percent |
|---|---|
| O-n-butyl-S-pentachlorophenyl thiolcarbonate | 50 |
| Attaclay | 48 |
| Marasperse N | 1 |
| Igepon AP extra concentration | 1 |

These ingredients are mixed thoroughly in a blender and then hammer-milled and air-milled to obtain a fine particle size which will readily disperse in water.

The above wettable powders or emulsion concentrates are sprayed on plants in amounts so that 1 to 5 pounds per acre of the active ingredient is applied to the plant foliage. When the active ingredient varies from 33⅓ to 50% about 2 to 15 pounds per acre of mixture are employed.

EXAMPLE 6

A suitable dust mixture can be prepared by mixing the fungicidally active ingredient with attaclay, talc or pyrax and sodium carbonate with the addition of a non-ionic or anionic surface-active agent. Such a composition is prepared as follows:

| | Percent |
|---|---|
| O-methyl-S-pentachlorophenyl thiolcarbonate | 5 |
| Attaclay | 3.3 |
| Kreelon | 2.0 |
| Na₂CO₃ | 1.5 |
| Pyrax | 90.0 |

These ingredients are mixed uniformly and then hammer-milled and air-milled to obtain a fine particle, uniform-flowing, dust.

This dust is applied to plants to be treated in the conventional manner for fine dusts. The amount of dust applied to the plants is regulated so that from 1 to 5 pounds per acre of the active ingredient is employed. Thus, when a 5% formulation is used, no more than 100 pounds per acre of the dust preparation would be applied.

From the above data, it will be seen that the novel compounds of the invention are efficacious in the control of one or more types of fungi.

The novel compounds of my invention are also effective in killing the larvae of the sea lamprey. The sea lamprey is an eel-like fish with a sucker-like mouth, sharp teeth and a tongue as rough as a file. The lamprey attaches itself to another fish with its mouth, it rasps a hole in the fish's body and sucks the blood and body juices of the fish. The victim thrashes about violently but cannot shake off its parasite and since the lamprey is a fast swimmer with an excellent vision, it has no trouble in attaching itself to commercial fish and killing large quantities of them. It has been established that the sea lamprey has reduced the supply of lake trout in the Great Lakes by many millions of pounds and that commercial fishing in these lakes is no longer feasible.

Near the end of their life cycle the sea lamprey travel up the tributaries of the Great Lakes to spawn in small shallow streams. The female lamprey hatches eggs which produce larvae that burrow into the sand and gravel where they live and grow for approximately five years. It is during this period that the larvae are vulnerable to attack by the compounds of my invention.

It is important in treating the sea lamprey with chemicals that only the lamprey larvae are attacked and that the active ingredient is not toxic to the many other fish species.

The toxicity of the compounds of my invention to sea lamprey larvae was tested by placing the larvae of the sea lamprey together with fingerlings of two other species of fish in 8-liter battery jars containing 5 liters of water. The jars are provided with aeration through standard stone air-breakers and are maintained at a constant temperature of 55° by immersion in specifically constructed constant temperature troughs.

The O-ethyl-S-pentachlorophenyl thiolcarbonate was dissolved in acetone and added to the 5 liters of water in the bell jar at a concentration of 5 parts per million and after 24 hours the sea lamprey larvae were dead whereas the fingerling specimens of the other fish were unaffected. The experiment was repeated with a concentration of the active ingredient at 1.0, 0.1 and 0.01 part per million. At all concentrations tested effective kill of the sea lamprey were obtained without apparent harm to the other species of fish.

It will be obvious to those skilled in the art that many modifications may be made within the scope of the present invention without departing from the spirit thereof and the invention includes all such modifications.

I claim:
1. The compounds having the structure

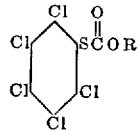

where R is alkyl and contains from 1 to 4 carbon atoms.
2. The compound

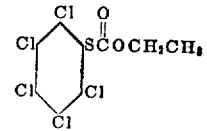

(References on following page)

References Cited in the file of this patent

UNITED STATES PATENTS

| | | |
|---|---|---|
| 2,212,895 | Allen | Aug. 27, 1940 |
| 2,328,159 | Martin et al. | Aug. 31, 1943 |
| 2,510,025 | Moyle | May 30, 1950 |
| 2,548,141 | Bralley | Apr. 10, 1951 |
| 2,567,987 | Bumgartner | Sept. 18, 1951 |
| 2,754,229 | Fredenburg et al. | July 10, 1956 |
| 2,790,267 | Lee | Apr. 30, 1957 |
| 2,821,499 | Applegate et al. | Jan. 28, 1958 |

OTHER REFERENCES

Horsfall: "Fungicides and Their Action," 1945, pp. 151–152, Chronica Botanica Co., Waltham, Mass.

Davies et al.: "Chemical Constitution and Fungistatic Action of Organic Sulfur Compounds," Biochem. J., vol. 40, pp. 331–334, 1946.